Dec. 1, 1970   C. E. QUINN   3,544,799
PHOTOELECTRIC LIQUID LEVEL DETECTOR WITH CHECKOUT
MEANS WHICH INCREASES OUTPUT OF LAMP TO
SIMULATE LOW-LEVEL CONDITION
Filed Oct. 23, 1968

INVENTOR.
Clark E. Quinn
BY
Hugh L. Fisher
ATTORNEY

United States Patent Office 3,544,799
Patented Dec. 1, 1970

3,544,799
PHOTOELECTRIC LIQUID LEVEL DETECTOR WITH CHECKOUT MEANS WHICH INCREASES OUTPUT OF LAMP TO SIMULATE LOW-LEVEL CONDITION
Clark E. Quinn, Rochester, Mich., assignor to General Motors Corporation, Detroit, Mich., a corporation of Delaware
Filed Oct. 23, 1968, Ser. No. 769,961
Int. Cl. G01l 21/24
U.S. Cl. 250—218                    6 Claims

ABSTRACT OF THE DISCLOSURE

A photoelectric liquid level detector incorporating a photosensitive indicating circiut and a parallel checkout circuit. The checkout circuit is selectively operable to instantaneously increase the illumination intensity of a lamp employed by the detector so as to simulate a low liquid level condition. If the detector is operating satisfactorily, an indicator lamp in the photosensitive indicating circuit will be illuminated.

---

This invention relates to improvements in photoelectric liquid level detectors.

Photoelectric liquid level detectors of various configurations have been utilized in many diverse applications. Generally, the purpose of these detectors is to provide visual information about the liquid level of the system being monitored. As long as these photoelectric liquid level detectors are operating satisfactorily there is no problem, but if the detector malfunctions false liquid level information may be provided.

Accordingly, a general object of the invention is to provide a photoelectric liquid level detector incorporating a provision for checking the detector operation against malfunctions.

Another object is to provide a detector with photosensitive indicating and checkout circuits that are particularly suited for combining so that the operation of the detector can be easily checked at any time.

A more specific object is to provide a checkout circuit involving a minimum of components, is easily combined with photosensitive indicating circuitry, and will not interfere with the photosensitive indicating circuitry's operation.

The invention is carried out according to one embodiment by positioning a light reflecting surface in a reservoir containing liquid, illuminating the light reflecting surface, sensing light reflected from the light reflecting surface, and indicating the presence or absence of liquid in contact with the light reflecting surface in response to changes in the amount of light reflected by the light reflecting surface. A check of the detector operativeness is provided by increasing the illumination of the light reflecting surface sufficiently to activate the indicating apparatus. Failure of the indicating apparatus to become so activated advises of a malfunction in the system.

Figure 1:
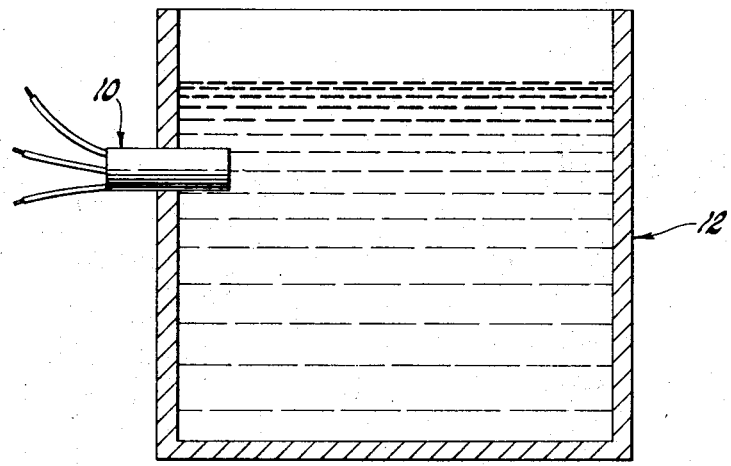
Figure 2:
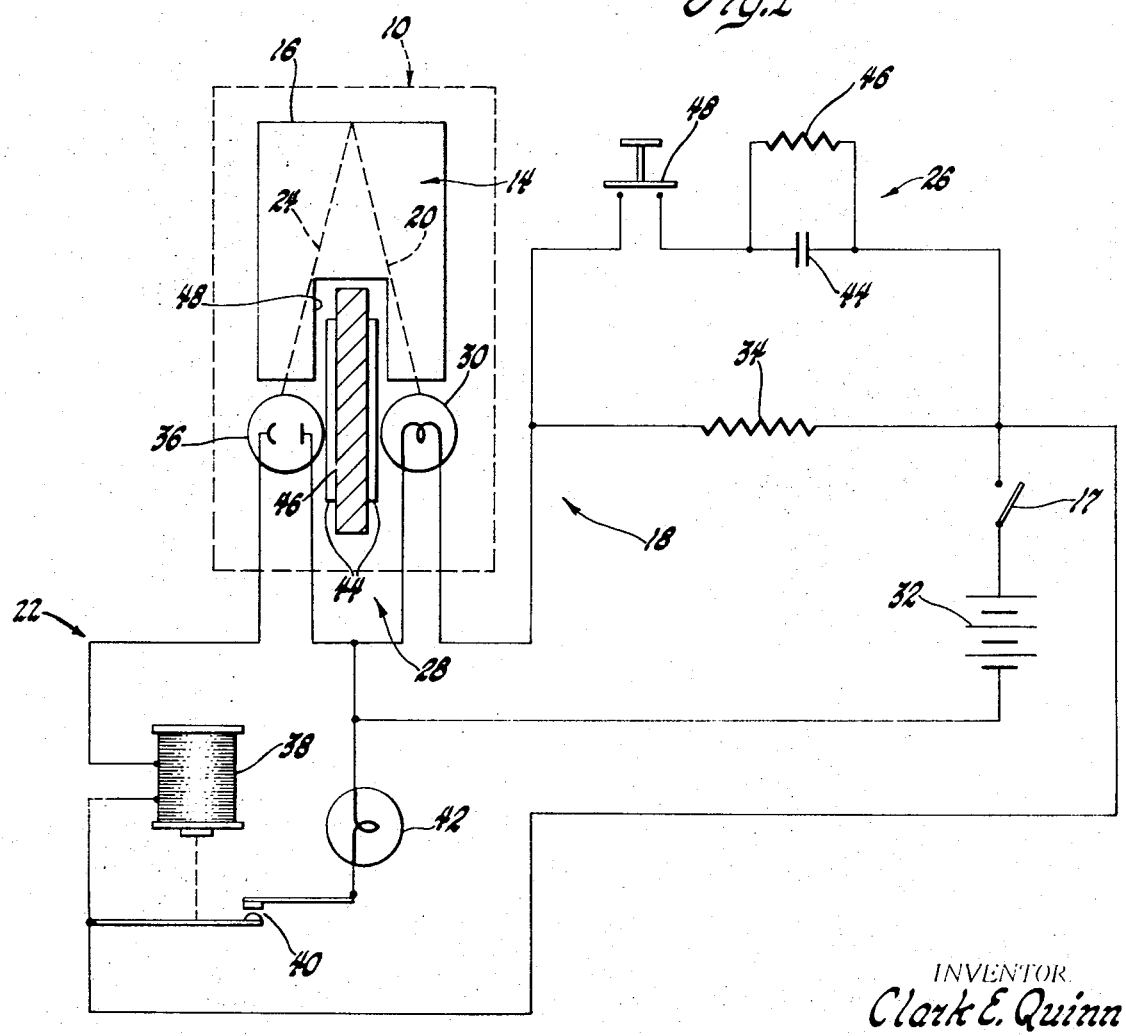

The foregoing and other objects and advantages of the invention will become apparent from the following description and from the accompanying drawings, in which:

FIG. 1 illustrates diagrammatically the positioning of a photoelectric liquid level detector incorporating the principles of the invention in a liquid reservoir; and FIG. 2 is a schematic diagram of the photoelectric liquid level detector circuitry.

Referring now to the drawings, and initially to FIG. 1, a photoelectric liquid level detector 10 is positioned in a liquid reservoir 12 at a liquid level which is to be detected. In the illustrated embodiment of this invention, the reservoir 12 contains hydraulic brake fluid of a vehicle and the detector 10 is positioned to detect the condition of brake fluid falling below a level of interest. It is recognized, however, that this invention may be utilized in other applications, examples of which are the detection of oil in a vehicle crankcase and water in a vehicle cooling system falling below desired levels. The detector 10 can similarly detect attaining a level of interest while filling the reservoir 12 simply by changing the meaning of a given signal as the only criteria is that the detector 10 indicate differently when immersed in liquid than when not so immersed. In each of these applications the detector 10 can be utilized to indicate if the liquid in the reservoir 12 is above or below the level of the detector 10 positioned in the reservoir 12.

As is disclosed in FIG. 2, the detector 10 includes a lens probe 14 having a light reflecting surface 16. The light reflecting surface 16 is positioned in the reservoir 12 at the liquid level to be detected. The detector 10 is energized upon the closure of a switch 17, which can be a vehicle ignition switch. The detector 10 includes a light source circuit 18 to illuminate the light reflecting surface 16 by radiating light through the lens probe 14 along a light path 20 and a photosensitive indicating circuit 22 to sense changes in light reflected along a light path 24 by the light reflecting surface 16 and to provide an observer with an indication of these changes. In a fashion to be further described, operativeness of the detector 10 is checked by providing a checkout circuit 26 to selectively increase the intensity of light generated by the light source circuit 18. The detector 10 also includes a shield device 28 which controls the level of ambient light striking the photosensitive indicating circuit 22 and may be adjusted to enhance the operation of the checkout circuit 26 as will be described below.

The light source circuit 18 in this embodiment is comprised of a lamp 30 which is energized by a battery 32 through a resistor 34. The resistor 34 is an illumination controlling impedance used to establish the light intensity of the lamp 30. In a conventional vehicle application, the battery 32 would be the twelve-volt vehicle battery and the lamp 30 would be selected to have an extremely long life when operated at a voltage of approximately two volts, an example of which is the incandescent lamp #253 manufactured by the General Electric Company and having a rated life of 10,000 hours when operated at two volts. This necessitates choosing the value of the resistor 34 to produce a ten-volt drop between the battery 32 and the lamp 30.

The lens probe 14 may be manufactured of plastic, glass, or any other transparent material. The purpose of the lens probe 14 is to provide a light reflecting surface 16 which forms an interface with its surroundings. When the surface 16 is in contact with liquid, as it is under normal conditions in a vehicle brake fluid reservoir, the lens-liquid interface formed at the surface 16 tends to transmit light from the lens probe 14 to the liquid. This produces a minimum of light reflections in the lens probe 14. When the light reflecting surface 16 is above the liquid in the reservoir 14, a highly reflective lens-air interface is formed at the surface 16. Under these conditions, light waves generated by the lamp 30 and transmitted along the light path 20 are mostly reflected at the light reflecting surface 16 and transmitted along the light path 24 to the photosensitive indicating circuit 22.

The photosensitive indicating circuit 22 is comprised of a photocell 36 and a relay 38 connected in series with the battery 32. The photosensitive indicating circuit 22 also includes a set of normally open contacts 40 and an indicator lamp 42 in series with the battery 32. It is recognized that other elements such as phototransistors and indicating meters could be used to replace various elements in the photosensitive indicating circuit 22. It is similarly recognized that a direct connection between the photocell 36 and an indicator device could be utilized. As those versed in the art will understand, this will be determined by the application of the detector 10 and the required circuit parameters.

In the illustrated embodiment the photocell 36 is of the photoresistive type and is normally in such a high resistance state that current in the relay 38 is insufficient to energize the relay 38, leaving the contacts 40 open and keeping the indicator lamp 42 in its deenergized condition. When the liquid in the reservoir 12 falls sufficiently to permit a lens-air interface to be formed at the surface 16, the light reflected along the path 24 to the photocell 36 lowers the photocell 36 resistance sufficiently to pick up the relay 38, closing the contacts 40 and energizing the indicator lamp 42. The indicator lamp 42 is thus utilized to advise an observer of the low liquid level in the reservoir 12.

The checkout circuit 26 provides a way of utilizing the indicator lamp 42 to check the detector 10 against malfunctions. The checkout circuit 26 acts as a voltage pulse source with power supplied by the battery 32 and is comprised of a capacitor 44 in parallel with a resistor 46 and in series with a switch 48, wherein shown to be of the push button type. The checkout circuit 26 is combined with the detector 10 by connecting it in parellel with the resistor 34.

The detector 10 operation may be checked for malfunctions by closing the switch 48, instantaneously applying a voltage pulse to the lamp 30 through the capacitor 44 and the switch 48. The voltage pulse greatly increases the light intensity of the lamp 30. Due to the much greater light striking the suface 16 the light reflections from the surface 16 change the resistance of the photocell 36 to a very low level. This will occur even in the presence of a lens-liquid interface at the surface 16. The reduced resistance of the photocell 36 energizes the indicator lamp 42 in the fashion above described. Failure of the indicator lamp 42 to become energized when the switch 48 is closed would indicate to an observer that a malfunction exists in the detector 10.

A few milliseconds after closing the switch 48 to check the detector 10 operation the capacitor 44 becomes charged, increasing the resistance in series with the lamp 30 and decreasing the lamp 30 illumination to its normal level. This is to prevent materially shortening the life of the lamp 30. The normal illumination of the lamp 30 would sufficiently lower the resistance of the photocell 36 to return the relay 38 to its deenergized state were it not for the sustaining action of the light shield device 28, which may be adjusted to maintain the relay 38 and the indicator lamp 42 in their energized conditions as long as is desired.

The light shield device 28 is comprised of a holder 44 and a light shield 46. The light shield 46 is made of opaque material and is slidably held in the holder 44 so as to adjustably control the illumination of the photocell 38. The protrusion of the light shield 46 into a slot 48 formed in the lens probe 14 is used to control the illumination of the photocell 36. This illumination is maintained at a sufficiently high level to keep the photocell 36 from dropping out the relay 38. The indicator lamp 42 is thus kept energized until the switch 17 is opened, turning off the power supplied to the detector 10 by the battery 32. Opening the switch 17 deenergizes the relay 38 and the lamp 42. Subsequent closing of the switch 17 places the detector 10 in normal operation.

Due to the sustaining action of the light shield device 28 described above, the switch 48 in the checkout circuit 26 may be opened at any time after the indicator lamp 42 has become energized. Upon opening the switch 48 the capacitor 44 is discharged through the resistor 46, returning the checkout circuit 26 to normal.

While many variations in this invention will be apparent to those skilled in the art, it is understood that the invention is to be limited only by the following claims.

What is claimed is:

1. In a photoelectric liquid level detector, the combination of a reservoir for liquid, light reflecting means positioned at a certain point in the reservoir and operative to reflect light in accordance with the extent of exposure thereof to the liquid in the reservoir, a light source illuminating the light reflecting means, photosensitive indicating means operative in response to changes in the light reflected by the light reflecting means to indicate when the liquid is at other than the certain point in the reservoir, and checkout means selectively operable for varying the light source illumination intensity to simulate the condition when the liquid is at other than the certain point so as to permit the operation of the detector to be checked.

2. In a photoelectric liquid level detector, the combination of a reservoir for liquid, a lens probe having a light reflecting surface positioned in the reservoir so as to be exposed to the liquid in the reservoir when the liquid is at a certain level and reflect light according to the extent of liquid exposure thereof, a voltage operated light source illuminating the light reflecting surface, photosensitive indicating means responsive to the light reflected by the light reflecting surface, the photosensitive indicating means being operative to indicate when the liquid is below the certain level, and checkout means monitoring the operation of the detector, the checkout means including a voltage pulse source and a switch selectively operable to instantaneously connect the voltage pulse source to the light source so as to vary the illumination from the light source for simulating the condition when liquid is below the certain level thereby enabling the operation of the detector to be checked.

3. In a photoelectric liquid level detector, the combination of a reservoir for liquid, a lens probe having a light reflecting surface positioned in the reservoir so as to be exposed to the liquid in the reservoir when the liquid is at a certain level and reflect light according to the extent of liquid exposure thereof, a light source including in series circuit a voltage source, a lamp illumination reducing impedance, and a lamp, the lamp being positioned proximate the lens probe so as to illuminate the light reflecting surface, photosensitive indicating means operative in response to changes in the light reflected by the light reflecting surface to indicate when the liquid is below the certain level, and a checkout circuit for monitoring the operation of the detector, the checkout circuit being in parallel with the lamp illumination reducing impedance and including a switch, the checkout circuit being rendered selectively operable by instantaneously closing the switch so as to shunt the lamp illumination reducing impedance and increase the lamp illumination intensity to simulate the condition when the liquid is below the certain level for determining whether the detector is operative.

4. In a photoelectric liquid level detector, the combination of a reservoir for liquid, a lens probe having a light reflecting surface positioned in the reservoir so as to be exposed to the liquid in the reservoir when the liquid is at a certain level and reflect light according to the extent of liquid exposure thereof, a light source including in series circuit a voltage source, a voltage dropping resistor, and a lamp, the lamp being positioned proximate the lens probe so as to illuminate the light reflecting surface, photosensitive indicating means operative in response to changes in the light reflected by the light reflecting surface to indicate when the liquid is below the certain level, the photosensitive indicating means including a photocell connected across the voltage source and indicator means controlled by the photocell, the photocell being positioned relative to the lens probe so as to be responsive to light reflected in the light reflecting surface and operative to cause the indicator means to be operated when the light reflected by the light reflecting surface corresponds to that when the liquid is below the certain level, and a checkout circuit for monitoring the operation of the detector, the checkout circuit being in parallel with the voltage dropping resistor and including a capacitor, a discharge resistor in parallel with the capacitor, and a switch in series with the capacitor and the discharge resistor, the checkout circuit being rendered selectively operable by instantaneously closing the switch to increase the lamp illumination intensity so as to simulate the condition when the liquid is below the certain level for determining whether the detector is operative.

5. In a photoelectric liquid level detector; the combination of a reservoir for liquid; a lens probe having a light reflecting surface positioned in the reservoir so as to be exposed to the liquid in the reservoir when the liquid is at a certain level and reflect light according to the extent of liquid exposure thereof; a light source including in series circuit a voltage source, a voltage dropping resistor, and a lamp, the lamp being positioned proximate the lens probe so as to illuminate the light reflecting surface; photosensitive indicating means operative in response to changes in the light reflected by the light reflecting surface to indicate when the liquid is below the certain level; the photosensitive indicating means including a relay and a photoresistive cell series connected across the voltage source, and an indicator lamp, the relay when energized being operative to connect the indicator lamp across the voltage source and illuminate the indicator lamp, the photoresistive cell being positioned relative to the lens probe so as to be responsive to light reflected in the light reflecting surface and operative to cause the relay to be energized and accordingly the indicator lamp illuminated when the light reflected by the light reflecting surface corresponds to that when the liquid is below the certain level; and a checkout circuit for monitoring the operation of the detector; the checkout circuit being in parallel with the voltage dropping resistor and including a capacitor, a discharge resistor in parallel with the capacitor, and a switch in series with the capacitor and the discharge resistor, the checkout circuit being rendered selectively operable by instantaneously closing the switch to increase the lamp illumination intensity so as to simulate the condition when the liquid is below the certain level for determining whether the detector is operative.

6. In a photoelectric liquid level detector, the combination of a reservoir for liquid, a lens probe having a light reflecting surface positioned in the reservoir so as to be exposed to the liquid in the reservoir when the liquid is at a certain level and reflect light according to the extent of liquid exposure thereof, a light source including in series circuit a voltage source, a voltage dropping resistor, and a lamp, the lamp being positioned proximate the lens probe so as to illuminate the light reflecting surface, photosensitive indicating means operative in response to changes in the light reflected by the light reflecting surface to indicate when the liquid is below the certain level, the photosensitive indicating means including a photocell connected across the voltage source and indicator means controlled by the photocell, the photocell being positioned relative to the lens probe so as to be responsive to light reflected in the light reflecting surface and operative to cause the indicator means to be operated when the light reflected by the light reflecting surface corresponds to that when the liquid is below the certain level, a light shield positioned to shield the photocell from direct light of the lamp and extending into the lens probe to control the level of light directed to the photocell by the light reflecting surface, and checkout means monitoring the operation of the detector, the checkout means including a voltage pulse source and a switch selectively operable to instantaneously connect the voltage pulse source to the light source so as to vary the illumination from the light source for simulating the condition when liquid is below the certain level thereby enabling the operation of the detector to be checked.

References Cited

UNITED STATES PATENTS

| | | | |
|---|---|---|---|
| 2,764,178 | 9/1956 | Paul et al. | 250—218 |
| 3,322,959 | 8/1967 | Lorenz | 250—218 |

WALTER STOLWEIN, Primary Examiner

M. ABRAMSON, Assistant Examiner

U.S. Cl. X.R.

250—205